United States Patent
Hahn

(10) Patent No.: US 6,983,993 B2
(45) Date of Patent: Jan. 10, 2006

(54) VEHICLE SEAT WITH FOLD-FLAT POSITION

(75) Inventor: Birger Hahn, Kirchheimbolanden (DE)

(73) Assignee: KEIPER GmbH & Co. KG, Kaiserlautern (DE)

( * ) Notice: Subject to any disclaimer, the term of this patent is extended or adjusted under 35 U.S.C. 154(b) by 0 days.

(21) Appl. No.: 10/802,989

(22) Filed: Mar. 17, 2004

(65) Prior Publication Data

US 2004/0183353 A1 Sep. 23, 2004

(30) Foreign Application Priority Data

Mar. 18, 2003 (DE) .......................... 103 11 735

(51) Int. Cl.
*B60N 2/02* (2006.01)

(52) U.S. Cl. .............. 297/378.1; 297/378.12; 297/378.14

(58) Field of Classification Search ............. 297/378.1, 297/378.12, 378.13
See application file for complete search history.

(56) References Cited

U.S. PATENT DOCUMENTS

| | | | |
|---|---|---|---|
| 4,690,458 A | | 9/1987 | Pipon et al. |
| 4,743,067 A | | 5/1988 | Pipon et al. |
| 5,433,507 A | * | 7/1995 | Chang ..................... 297/367 |
| 5,588,705 A | * | 12/1996 | Chang ..................... 297/367 |
| 5,884,973 A | * | 3/1999 | Reinhard et al. ...... 297/378.12 |
| 6,017,090 A | * | 1/2000 | Bonk ..................... 297/362.12 |
| 6,095,609 A | * | 8/2000 | Magadanz ............. 297/378.12 |
| 6,106,067 A | * | 8/2000 | Zhuang et al. ........... 297/361.1 |
| 6,139,105 A | * | 10/2000 | Morgos et al. ......... 297/378.12 |
| 6,152,533 A | * | 11/2000 | Smuk ..................... 297/341 |
| 6,155,644 A | * | 12/2000 | Rogala ................... 297/367 |
| 6,290,198 B1 | | 9/2001 | Kojima et al. |
| 6,336,679 B1 | * | 1/2002 | Smuk ................. 297/378.12 |
| 6,347,834 B1 | * | 2/2002 | Couasnon .............. 297/341 |
| 6,371,558 B1 | | 4/2002 | Couasnon |
| 6,557,941 B1 | * | 5/2003 | Heckel et al. ......... 297/354.12 |
| 6,629,730 B2 | * | 10/2003 | Makosa .................. 297/341 |
| 6,634,714 B1 | * | 10/2003 | Pejathaya ............ 297/378.12 |
| 6,669,299 B2 | * | 12/2003 | Carlson et al. ........ 297/378.14 |
| 2004/0075325 A1 | | 4/2004 | Assmann et al. |

FOREIGN PATENT DOCUMENTS

| | | |
|---|---|---|
| DE | 38 37 665 A1 | 5/1990 |
| EP | 0 169 096 A1 | 1/1986 |
| EP | 1 046 537 A2 | 10/2000 |
| FR | 2 783 209 | 3/2000 |
| GB | 2 264 146 A | 8/1993 |
| WO | WO 03/022622 A1 | 3/2003 |

* cited by examiner

*Primary Examiner*—Peter M. Cuomo
*Assistant Examiner*—Erika Garrett
(74) *Attorney, Agent, or Firm*—Womble Carlyle Sandridge & Rice, PLLC

(57) ABSTRACT

In a vehicle seat (1), in particular an automobile seat, with a seat substructure (3), a backrest structure (10), a backrest (12) that is adapted for folding between at least one use position and a fold-flat position, and at least one fitting (7) which is secured with a first fitting member (8) to the backrest structure (10) and with a second fitting member (9) to the seat substructure (3), a compensation spring (26) secured to the seat substructure is operatively connected to the backrest structure (10) by means of a movable linkage (28).

17 Claims, 2 Drawing Sheets

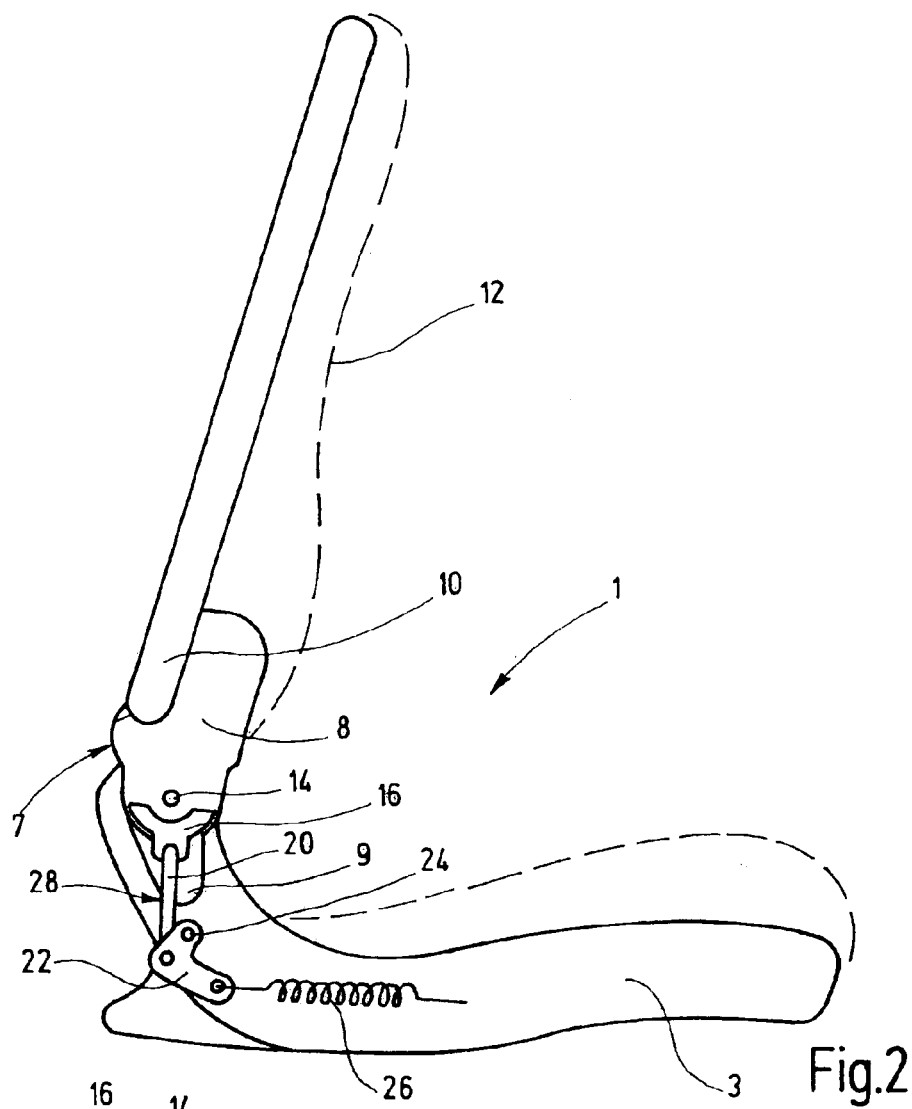
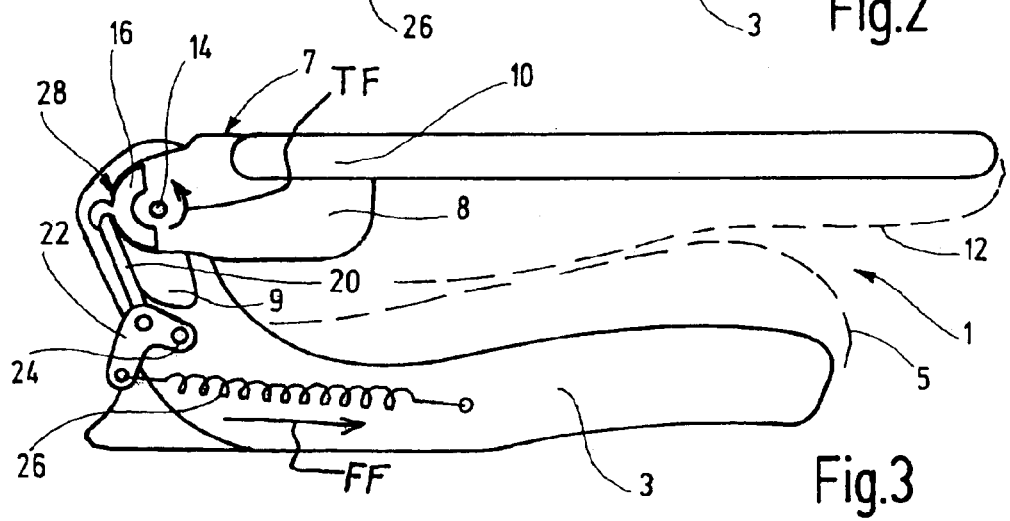

VEHICLE SEAT WITH FOLD-FLAT POSITION

BACKGROUND OF THE INVENTION

The present invention relates to a vehicle seat, in particular an automobile seat, having a fitting that is operative so that a backrest of the seat can be folding about an axis of rotation between a use position, in which a user can occupy the seat, and a fold-flat position.

In a vehicle seat, with a backrest that is arranged by means of hinge fittings on the substructure of the seat and is foldable to a flat position, a backrest compensation spring is used for balancing the weight of the backrest and, if need be, of the passenger. This spring is disclosed, for example, in DE 38 37 665 A1, in the form of a spiral spring. The backrest compensation spring may also be a torsion spring. In the case of vehicle seats with a fold-flat function, which permits folding the backrest forward to a substantially horizontal position, the rotation axis of the backrest must be arranged relatively high. This prevents a use of the known backrest compensation springs for reasons of rebound space.

BRIEF SUMMARY OF SOME ASPECTS OF THE INVENTION

An aspect of the present invention is the provision of an improvement to a vehicle seat having a backrest which can be folding about an axis of rotation between a use position, in which a user can occupy the seat, and a fold-flat position. In accordance with this aspect, the improvement relates to compensating for the weight of the backrest. In accordance with this aspect, a vehicle seat, in particular an automobile seat, has a seat substructure, a backrest structure, and at least one fitting. The fitting includes first and second fitting members, and the first fitting member is rotatable relative to the second fitting member about an axis of rotation. The first fitting member is secured to the backrest structure, and the second fitting member is secured to the seat substructure. The fitting is operative so that the backrest can be folded about the axis of rotation between at least one use position and a fold-flat position. A compensation spring is secured to the seat substructure and is operatively connected to the backrest structure via a movable linkage.

As a result of operatively connecting to the backrest structure, by means of a linkage, a compensation spring that is secured to the seat substructure, it becomes possible to overcome with the linkage the height difference between the axis of rotation and the substructure of the seat, and to transmit the compensation action of the compensation spring to the backrest. For a defined movement of the linkage, it preferably comprises interconnected components, such as levers, links, and connection bars. Angular shapes make it possible to achieve directional deflections.

Preferably, the compensation spring has a minimal bias in an intermediate position of the backrest between its use position and its fold-flat position, so that it cushions both during a transition to the use position and during a transition to the fold-flat position. This keeps the loads on the fitting especially small. The intermediate position constitutes a stable minimum for the backrest. Preferably, the linkage has a dead center in an intermediate position of the backrest between the position of use and the fold-flat position, which preferably corresponds to the intermediate position of the minimal bias of the compensation spring. The dead center separates the different directions and angles of transmission of the compensation effect, which are optimized for the transition to the use position on the one hand and to the fold-flat position on the other hand. In a preferred embodiment, the extension line of the connection bar intersects the axis of rotation in the dead center configuration (i.e., the connection bar and, therefore, the linkage, exerts no torque on fitting during the dead center configuration).

BRIEF DESCRIPTION OF THE DRAWINGS

In the following, the invention is described in greater detail with reference to an embodiment illustrated in the drawings, in which:

FIG. 2 is a corresponding side view during a transition to the fold-flat position, wherein the backrest occupies an intermediate position; and FIG. 3 is a corresponding side view in the fold-flat position.

DETAILED DESCRIPTION OF THE INVENTION

Figure 1:
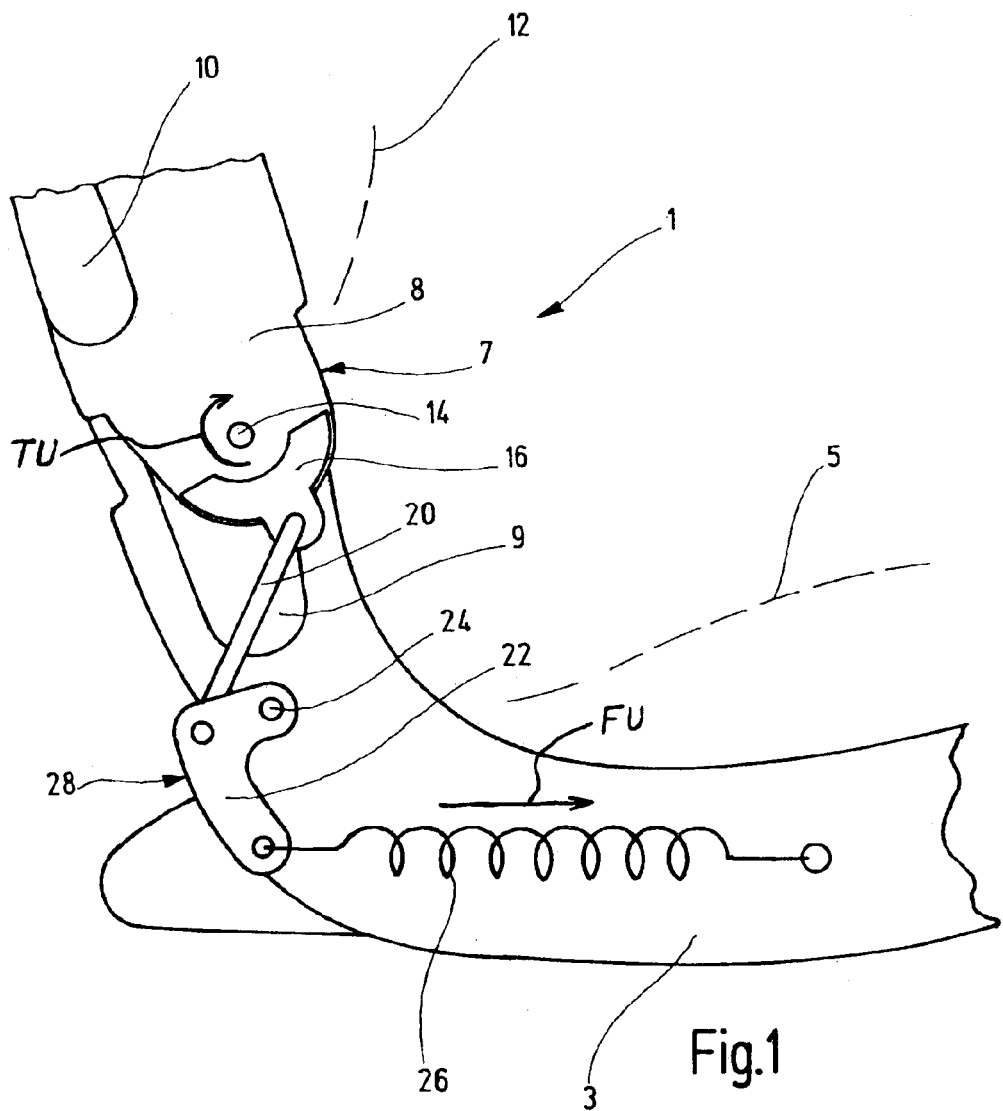
FIG. 1 is a side view of the embodiment in its use position.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A vehicle seat 1 is provided for a rear, i.e., second or third, seat row in a vehicle. A seat substructure 3 mounts a seat cushion 5, which is illustrated by broken lines in the drawings. There are two fittings 7, which are respectively arranged on each side of the vehicle seat. Each fitting 7 is constructed as a hinge fitting or a gear-operated fitting with a free-swing function. Each fitting 7 comprises a first fitting member 8 and a second fitting member 9, which can be rotated relative to each other and be locked in position with respect to one another. The two fittings 7 can be synchronously disengaged via a transmission bar (not shown) which extends between the fittings. Each first fitting member 8 is rigidly mounted to a backrest structure 10 of a backrest 12. Each second fitting member 9 is secured to the upward extending rear end region of the seat substructure 3. An axis of rotation 14 of the fitting 7 forms the axis of rotation of the backrest 12.

The first fitting member 8 mounts a backrest attachment element 16, which curves in concentric relationship about the axis of rotation 14. Connected to the backrest attachment element 16 with its one end is a connecting bar 20, whose other end is connected to a link 22. The link 22 is mounted for rotation to the seat substructure 3 by means of a bearing pin 24. The link 22 has an angular shape, with the connecting bar 20 being connected to the link 22 in the region of the tip of the link 22. The bearing pin 24 is arranged at the end of one leg of the link 22. Attached to the end of the other leg of the link 22 is a compensation spring 26 which engages (e.g., is mounted to) the seat substructure 3 with its other, forward directed end. The compensation spring 26 is preferably in the form of a tension spring. The biased compensation spring 26 that is secured to the seat substructure extends approximately horizontally and along the seat substructure 3. The backrest attachment element 16, the connecting bar 20, and the link 22 form a movable linkage 28, which operatively connects the compensation spring 26 to the backrest structure 10.

By means of disengaging and pivoting the fittings 7, the inclination-adjustable backrest 12 is able to occupy different positions of use, which are suitable for sitting. In this case, the backrest 12 is inclined relative the vertical in different positions toward the back, when viewed in the traveling direction, for example, by about 23° in the so-called design position. After disengaging the fitting 7, the backrest 12 may also be folded forward to a flat position. In this instance, the backside of the backrest 12 is arranged substantially horizontally and faces upward.

The linkage 28 is designed such that it occupies a dead center in an intermediate position of the backrest 12 between the positions in use and the fold-flat position. In this dead center, the connecting bar 20 extends perpendicularly to the backrest attachment element 16, i.e., the extension line of the radially projecting connecting bar 20 intersects the axis of rotation 14. In this instance, the compensation spring 26 has its smallest bias. From this intermediate position, the compensation spring 26 tensions in both directions to a greater extent, i.e., its cushions both toward the positions in use and the fold-flat position (e.g., arrows in FIGS. 1 and 3 respectively schematically represent spring forces FU and FF and respectively resulting torques TU and TF). Consequently, when the backrest 12 approaches one of these positions, a load on the fitting 7 by the weight of the backrest 12 will be avoided, thereby preventing damage of the fitting 7 during an engagement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A vehicle seat comprising:
    at least one fitting including a first fitting member, which is mounted to a backrest structure, and a second fitting member, which is mounted to a seat substructure, wherein the first fitting member is mounted to the second fitting member for pivoting relative to the second fitting member about an axis of rotation at least between a folded position and a use position, with the backrest structure extending at least about horizontally and at least partially over the seat substructure in the folded position, and the backrest structure extending more upwardly in the use position than in the folded position; and
    a compensation spring that is connected to the seat substructure, wherein the compensation spring is operatively connected to the backrest structure via a movable linkage for exerting torque that affects pivoting of the first fitting member relative to the second fitting member about the axis of rotation, and wherein the first fitting member can pivot relative to the second fitting member about the axis of rotation to at least an intermediate position that is between the folded position and the use position.
    the linkage is in a dead center configuration during the intermediate position, and
    during the dead center configuration: the compensation spring does not exert any torque, via the linkage, that is for affecting pivoting of the first fitting member relative to the second fitting member about the axis of rotation.

2. A vehicle seat according to claim 1, wherein the linkage includes a link, and the link is pivotally mounted to the seat substructure.

3. A vehicle seat according to claim 2, wherein the link has an angular shape.

4. A vehicle seat according to claim 2, wherein the compensation spring is attached to the link.

5. A vehicle seat according to claim 1, wherein the linkage includes a connecting bar, and the connecting bar is connected to the first fitting member.

6. A vehicle seat according to claim 5, wherein:
    the linkage further includes a backrest attachment element that is mounted to the first fitting member, and
    the connecting bar is connected to the backrest attachment element.

7. A vehicle seat according to claim 5, wherein:
    the linkage further includes a link,
    the link is pivotally mounted to the seat substructure,
    the compensation spring is connected to the link, and
    the connecting bar is connected to the link.

8. A vehicle seat according to claim 1, wherein:
    the compensation spring exerts:
        a first force during the folded position, and
        a second force during the use position; and
    any force exerted by the compensation spring during the intermediate position is lesser in magnitude than each of the first force and the second force.

9. A vehicle seat according to claim 1, wherein the linkage includes a connecting bar, and an elongate axis of the connecting bar intersects the axis of rotation during the dead center configuration.

10. A vehicle seat according to claim 3, wherein the compensation spring is attached to the link.

11. A vehicle seat according to claim 2, wherein the linkage includes a connecting bar, and the connecting bar is connected to the first fitting member.

12. A vehicle seat according to claim 4, wherein the linkage further includes a connecting bar, the connecting bar is connected to the first fitting member, and the connecting bar is attached to the link.

13. A vehicle seat according to claim 2, wherein:
    the first fitting member can pivot relative to the second fitting member about the axis of rotation to at least an intermediate position that is between the folded position and the use position;
    the compensation spring exerts:
        a first force during the folded position, and
        a second force during the use position; and
    any force exerted by the compensation spring during the intermediate position is lesser in magnitude than each of the first force and the second force.

14. A vehicle seat according to claim 5, wherein:
    the first fitting member can pivot relative to the second fitting member about the axis of rotation to at least an intermediate position that is between the folded position and the use position;
    the compensation spring exerts:
        a first force during the folded position, and
        a second force during the use position; and
    any force exerted by the compensation spring during the intermediate position is lesser in magnitude than each of the first force and the second force.

15. A vehicle seat according to claim 5, wherein:
the compensation spring exerts:
  a first force during the folded position, and
  a second force during the use position;
any force exerted by the compensation spring during the intermediate position is lesser in magnitude than each of the first force and the second force; and
during the dead center configuration: an elongate axis of the connecting bar intersects the axis of rotation so that the compensation spring does not exert any torque, via the linkage, that is for affecting pivoting of the first fitting member relative to the second fitting member about the axis of rotation.

16. A vehicle seat comprising:
at least one fitting including a first fitting member, which is mounted to a backrest structure, and a second fitting member, which is mounted to a seat substructure, wherein the first fitting member is mounted to the second fitting member for pivoting relative to the second fitting member about an axis of rotation at least between a folded position and a use position, with the backrest structure extending at least about horizontally and at least partially over the seat substructure in the folded position, and the backrest structure extending more upwardly in the use position than in the folded position; and
a compensation spring that is connected to the seat substructure, wherein the compensation spring is operatively connected to the backrest structure via a movable linkage for exerting torque that affects pivoting of the first fitting member relative to the second fitting member about the axis of rotation and wherein:
  the linkage is mounted for moving relative to both the backrest structure and the seat substructure in response to pivoting of the first fining member relative to the second fitting member about the axis of rotation;
  the torque, which is provided by the compensation spring via the linkage, includes at least:
    a first torque while the first fitting member is pivoted relative to the second fitting member about the axis of rotation toward the folded position, with the first torque opposing pivoting of the first fitting member relative to the second fitting member about the axis of rotation toward the folded position, and
    a second torque while the first fitting member is pivoted relative to the second fitting member about the axis of rotation toward the use position, with the second torque opposing pivoting of the first fitting member relative to the second fitting member about the axis of rotation toward the use position;
  the first torque and the second torque extend in opposite directions from one another; and
  the compensation spring and the linkage are arranged so that:
    the first torque is not present during the use position, and
    the second torque is not present during the folded position.

17. A vehicle seat comprising:
at least one fitting including a first fitting member, which is mounted to a backrest structure, and a second fitting member, which is mounted to a seat substructure, wherein the first fitting member is mounted to the second fitting member for pivoting relative to the second fitting member about an axis of rotation at least between a folded position and a use position, with the backrest structure extending at least about horizontally in the folded position, and the backrest structure extending more upwardly in the use position than in the folded position;
a linkage mounted for moving relative to both the backrest structure and the seat substructure in response to pivoting of the first fitting member relative to the second fitting member about the axis of rotation; and
a compensation spring operatively connected to the backrest structure via the linkage for exerting at least:
  a first torque while the first fitting member is pivoted relative to the second fitting member about the axis of rotation toward the folded position, with the first torque opposing pivoting of the first fitting member relative to the second fitting member about the axis of rotation toward the folded position, and
  a second torque while the first fitting member is pivoted relative to the second fitting member about the axis of rotation toward the use position, with the second torque opposing pivoting of the first fitting member relative to the second fitting member about the axis of rotation toward the use position,
wherein the first torque and the second torque extend in opposite directions from one another, and
wherein the compensation spring and the linkage are arranged so that:
  the first torque is not present during the use position, and
  the second torque is not present during the folded position.

* * * * *